Sept. 15, 1936.  F. FRELIN  2,054,622
VALVE MECHANISM
Filed Aug. 23, 1935  2 Sheets-Sheet 2
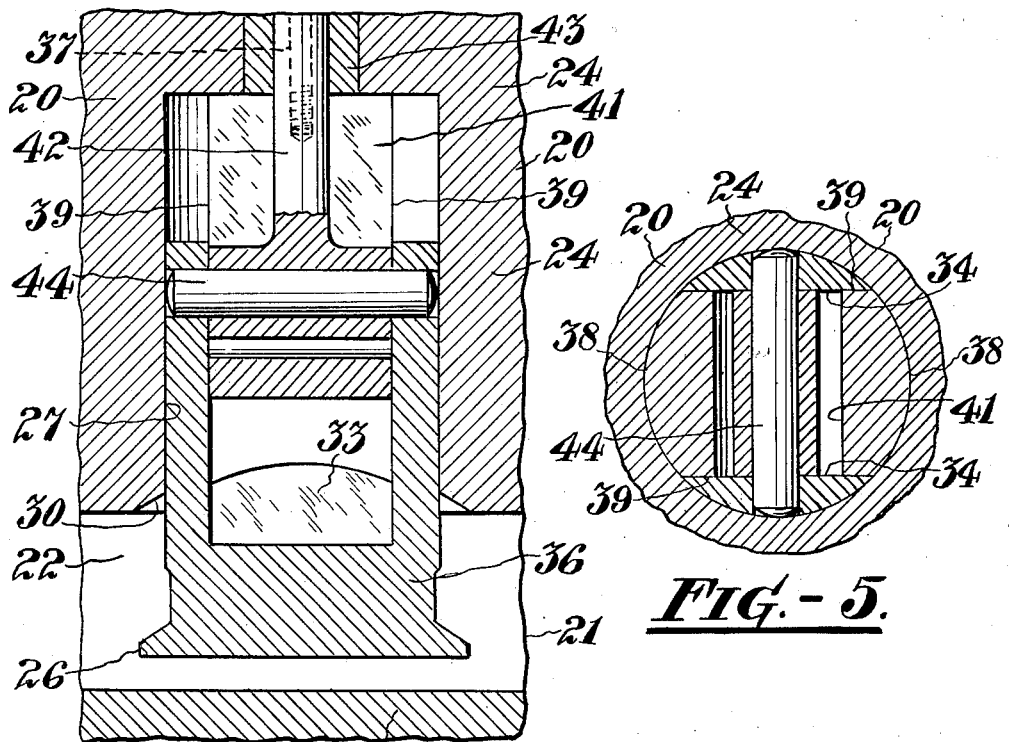
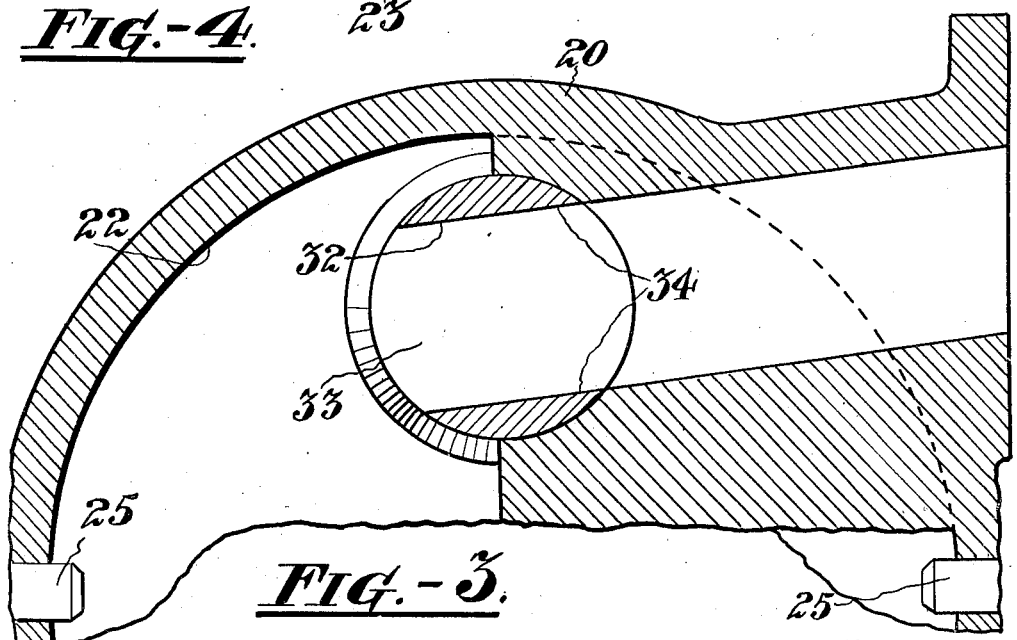
INVENTOR
Fritjof Frelin.
BY Chester A. Adlee
HIS ATTORNEY.

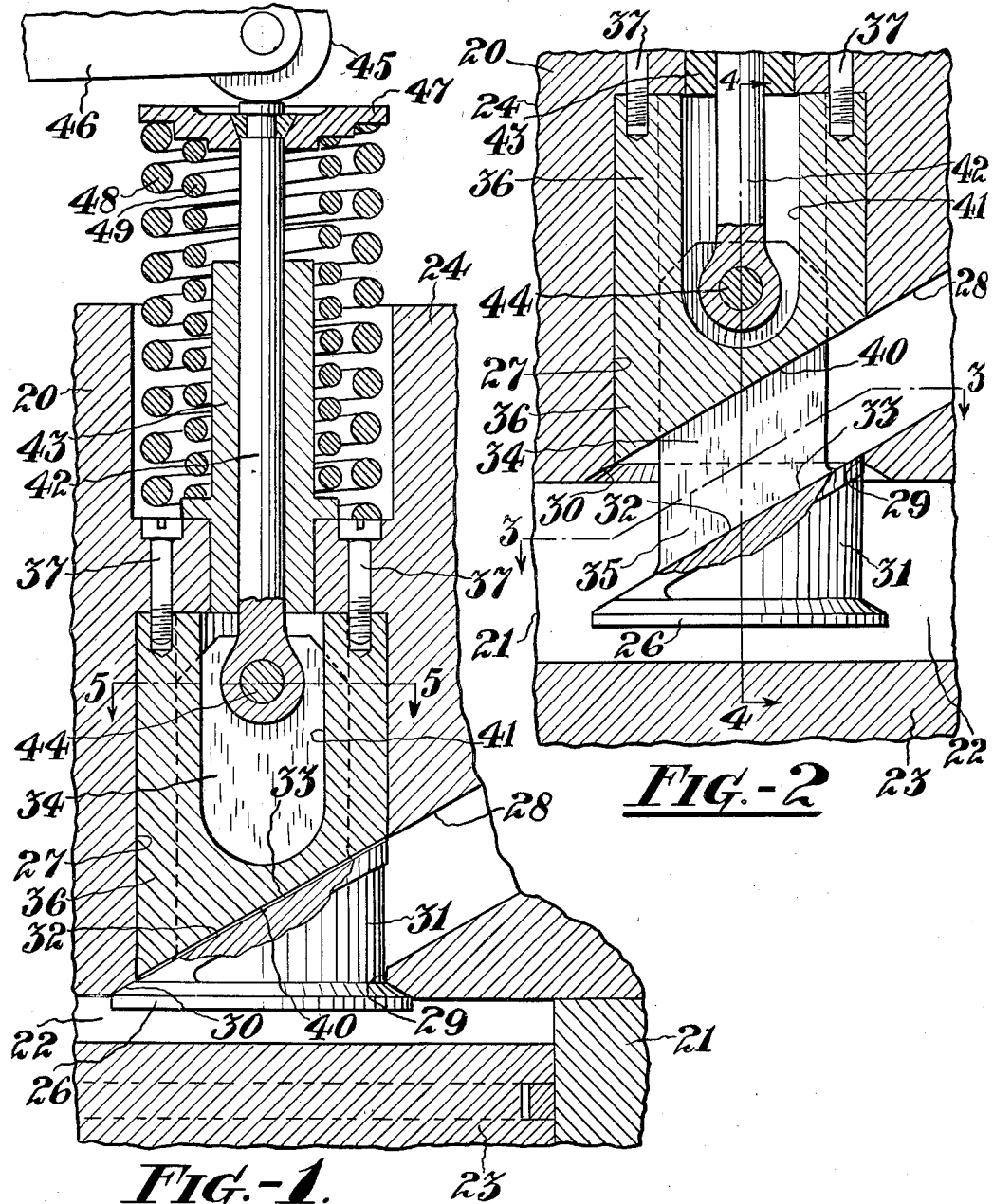

Patented Sept. 15, 1936

2,054,622

UNITED STATES PATENT OFFICE 2,054,622

VALVE MECHANISM

Fritjof Frelin, Phillipsburg, N. J., assignor to Ingersoll-Rand Company, Jersey City, N. J., a corporation of New Jersey Application August 23, 1935, Serial No. 37,449

6 Claims. (Cl. 123—188)

This invention relates to valve mechanisms, and more particularly to an air inlet valve for an internal combustion engine.

One object of the invention is to provide an uninterrupted air inlet passage and thereby cause a substantial stream line flow of the air into the combustion chamber of the engine.

Another object is to assure a high degree of rotative turbulence of the air mass admitted into the combustion chamber.

Other objects will be in part obvious and in part pointed out hereinafter.

In the drawings accompanying this specification and in which similar reference numerals refer to similar parts, Figure 1 is an elevation, in section, of a portion of an engine equipped with valve mechanism constructed in accordance with the practice of the invention and showing the valve occupying its closed position, Figure 2 is a similar view showing the valve in the open position, Figure 3 is a transverse view taken through Figure 2 on the line 3—3, Figure 4 is an elevation, in section, taken through Figure 2 on the line 4—4 looking in the direction indicated by the arrows, and Figure 5 is a transverse view taken through Figure 1 on the line 5—5.

Referring more particularly to the drawings, the engine, shown for the purpose of illustrating a practical embodiment of the invention, is designated by 20 and comprises a cylinder 21 having a chamber 22 to accommodate a piston 23. The chamber 22 constitutes both a piston chamber and a combustion chamber and a closure is provided therefor, by a head 24 which may be secured to the cylinder 21 in any well known manner.

The fuel for operating the engine is injected into the chamber 22 through spray nozzles 25 seated in the wall of the cylinder and on diametrically opposite sides of the chamber 22, preferably at right angles to the plane extending through the valves controlling the admission of air into the chamber 22 and the exhaust of burned gases from the chamber. The nozles 25 may be connected for communication with a suitable source of fuel supply (not shown).

The air inlet valve designated 26 is, as is customary, arranged in the head 24 in the present instance in a cylindrical recess 27 which coalesces with an air inlet passage 28 in the head. The end of the recess 27 adjacent the chamber 22 constitutes the air inlet port 29 and merges into a bevelled surface which constitutes a seating surface 30 for the valve 26. The passage 28 is inclined with respect to the longitudinal axis of the cylinder and extends tangentially of the combustion chamber so that the air, upon entering the chamber, is deflected by its wall and caused to rotate about the axis of the chamber as a rapidly revolving mass in order to effect a thorough oxygenization of the fuel issuing from the nozzles 25.

On the rear surface of the valve 26 is a body portion or stem 31 which extends slidably into the recess 27 and is provided with a longitudinal slot 32 which opens from the rear or upper end of the stem and terminates at its front end in an inclined surface 33 corresponding to the degree of inclination of the passage 28. The slot 32 is of the same width as the passage 28 so that its side surfaces 34 will be aligned with the corresponding walls of the passage 28 for which the slot 32 forms a continuing portion 35.

To the end that the valve 26 may be held against rotary movement for retaining the slot 32 in the correct position with respect to the passage 28 a valve guide 36 is disposed in the recess 27 to interlockingly engage the valve. The valve guide is affixed to the head 24 by screws 37 and has a pair of opposed convex surfaces 38 to seat against the wall of the recess 27 and the portions of the surface of the valve guide lying between the surfaces 38 are flatted to provide bearing surfaces 39 for the surfaces 34 of the valve stem whereby they are slidably engaged.

On the end of the guide member 36 confronting the port 29 is an inclined surface 40 which is in alignment with the upper surface of the passage 28 and inclined in the same degree. In the rearward portion of the guide member 36 is a slot 41 to permit the free reciprocation of a rod 42 which serves to transmit the force required for opening the valve 26. The rod 42 extends slidably through a guide member 43 in the head 24 and is connected to the portions of the valve stem 31 lying on opposite sides of the guide member 36 by a pin 44 extending through the end of the rod 42 and seated in the stem 31.

The rod 42 projects above the head 24 for engagement with a roller 45 carried by a rocker arm 46 whereby the valve is actuated to its open position. The rod 42 carries a flange 47 which acts as an abutment for a pair of springs 48 and 49 encircling the rod 42 and acting against the head 24 to close the valve 26 and hold it in sealing engagement with the seating surface 30.

From the foregoing description it will be apparent that when the valve 26 occupies its fully open position all the surfaces of the slot 32 and the guide member 36 which define the portion of the passage 28 in the valve stem will be in alignment with the corresponding portions or surfaces of the passage 28 in the head 24. A direct and unobstructed passageway is thereby provided for the air stream. The air will, therefore, enter the combustion chamber as a solid stream of which all portions flow in substantially the desired direction instead of eddying relatively to the main stream as is usually the case in structures in which portions of the valve structure, such as the valve stem, extend across the path of air flow.

By conveying the air through the inclined passage and directing it tangentially of the combustion chamber so that it strikes the cylinder wall, the air is caused to swirl rapidly along a spiral course through the piston chamber and, on passing the nozzles 25, will mix with the fuel being injected into the combustion chamber and form a homogeneous and thoroughly combustible charge, throughout all portions of the fuel charge.

I claim:

1. In valve mechanism for an internal combustion engine, the combination of a casing having a combustion chamber and an air inlet passage to said combustion chamber, and a valve to control the admission of air into the combustion chamber and having an internal channel to align with the inlet passage and convey air from the inlet passage to the combustion chamber.

2. In valve mechanism for an internal combustion engine the combination of a casing having a combustion chamber and an air inlet passage to said combustion chamber, a valve to control said passage, and a guide stem for the valve having a channel through the stem to align with the inlet passage and convey air from the passage to the combustion chamber.

3. In valve mechanism for an internal combustion engine, the combination of a casing having a combustion chamber and an air inlet passage to said combustion chamber, a valve to control the admission of air into the combustion chamber, a stem for the valve and having surfaces within the stem to align with the surfaces of the passage in the open position of the valve and defining a channel through the stem to convey air from the passage to the combustion chamber.

4. In valve mechanism for an internal combustion engine, the combination of a casing having a combustion chamber and an air inlet passage to said combustion chamber, a reciprocatory valve to control the admission of air into the combustion chamber, a stem for the valve, and a guide member for the valve extending around and into the stem, and surfaces within the stem and on the guide member to define, in the open position of the valve, a continuation of said passage.

5. In valve mechanism for an internal combustion engine, the combination of a casing having a combustion chamber and an air inlet passage to said combustion chamber and being inclined with respect to the longitudinal axis of the combustion chamber, a reciprocatory valve to control the admission of air into the combustion chamber, a stem on the valve, a slot in the stem to form a continuation of the passage in the open position of the valve, a guide extending into the slot to guide the valve, and a surface on the guide member forming a bounding surface for the portion of the passage lying within the stem.

6. In valve mechanism for an internal combustion engine, the combination of a casing having a combustion chamber and an air inlet passage, a valve to control the admission of air into the combustion chamber, means extending into the valve and having a surface to form a continuation of a surface defining the inlet passage, and surfaces on the valve cooperating with the first mentioned surface in the open position of the valve to define a channel for conveying air from the inlet passage to the combustion chamber.

FRITJOF FRELIN.